(12) United States Patent
Takahashi et al.

(10) Patent No.: US 6,498,700 B2
(45) Date of Patent: *Dec. 24, 2002

(54) DAMPING MATERIAL, DAMPING METHOD AND DISC DRIVE

(75) Inventors: Nobuyuki Takahashi, Osaka (JP); Hideyuki Kitai, Osaka (JP); Kazumasa Tanaka, Osaka (JP); Manabu Matsunaga, Osaka (JP); Yasunori Sugihara, Osaka (JP)

(73) Assignee: Nitto Denko Corporation, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/379,612

(22) Filed: Aug. 24, 1999

(65) Prior Publication Data

US 2002/0001155 A1 Jan. 3, 2002

(30) Foreign Application Priority Data

Aug. 24, 1998 (JP) .......................... 10-253258
Sep. 3, 1998 (JP) .......................... 10-267466
Sep. 3, 1998 (JP) .......................... 10-267467

(51) Int. Cl.$^7$ .......................... G11B 33/08; E04B 1/82
(52) U.S. Cl. .......................... 360/97.01; 181/286
(58) Field of Search .......................... 360/97.01, 97.02; 428/304.4; 181/201, 202, 286, 294, 207–209

(56) References Cited

U.S. PATENT DOCUMENTS

| | | | | |
|---|---|---|---|---|
| 3,894,169 A | * | 7/1975 | Miller .................. | 181/207 |
| 4,705,139 A | * | 11/1987 | Gahlau et al. .......... | 181/286 |
| 5,142,511 A | * | 8/1992 | Kanai et al. ........... | 367/164 |
| 5,373,102 A | * | 12/1994 | Ehrlich et al. ......... | 174/35 R |
| 5,400,296 A | | 3/1995 | Cushman et al. | |
| 5,658,656 A | * | 8/1997 | Whitney et al. ......... | 181/198 |
| 5,674,802 A | * | 10/1997 | Sheppard .............. | 502/439 |
| 5,691,037 A | * | 11/1997 | McCutcheon et al. ..... | 181/207 |
| 5,754,491 A | | 5/1998 | Cushman | |
| 5,761,184 A | | 6/1998 | Dauber et al. | |
| 5,824,973 A | * | 10/1998 | Haines et al. ......... | 181/286 |
| 5,875,067 A | * | 2/1999 | Morris et al. ......... | 360/97.01 |
| 5,982,580 A | * | 11/1999 | Woldemar et al. ....... | 360/97.01 |
| 6,013,362 A | * | 1/2000 | Takahashi et al. ...... | 428/304.4 |
| 6,145,617 A | * | 11/2000 | Alts .................. | 181/286 |
| 6,266,207 B1 | * | 7/2001 | Iwahara et al. ........ | 360/97.02 |
| 6,285,525 B1 | * | 9/2001 | McCutcheon et al. .... | 360/98.08 |
| 6,376,396 B1 | * | 4/2002 | Thorn et al. .......... | 181/290 |

FOREIGN PATENT DOCUMENTS

| | | |
|---|---|---|
| JP | 10-119219 A | 5/1998 |
| JP | 10-119220 A | 5/1998 |
| JP | 10-254453 A | 9/1998 |
| JP | 10-254454 A | 9/1998 |

OTHER PUBLICATIONS

"Data for Material=61568", NASA/MSFC Materials and Processes Home Page, Apr. 16, 2001, pp. 1 and 2.*
Damping Aluminum Foam Sheets, 4014, 3M, Aug. 1995.*

* cited by examiner

Primary Examiner—David Hudspeth
Assistant Examiner—Angel Castro
(74) Attorney, Agent, or Firm—Sughrue Mion, PLLC

(57) ABSTRACT

A damping material is made of a porous member having an absolute characteristic impedance value of not less than 800 kg/m$^2$·S in the frequency range of from 1.0 to 3.0 kHz. A damping method has steps of providing a damping material in the interior or on the periphery of a vibration-generating apparatus, characterized in that as the damping material there is used a compressible porous member having an air permeability of from $1\times\frac{1}{10}^{10}$ to $2\times\frac{1}{10}^{2}$ cc/cm$^2$/sec based on an atmospheric pressure difference of $2.039\times\frac{1}{10}^{4}$ mMH$_2$O or a porous member having an absolute impedance value of not less than 800 kg/m$^2$·S in a frequency range of from 1 to 3 kHz or one obtained by providing a film layer thereon. A disc drive has a motor for rotating a disc as a data recording medium and a damping material provided in the interior and/or on the periphery of a housing having at least a space in which the disc can be mounted.

20 Claims, 2 Drawing Sheets

DAMPING MATERIAL, DAMPING METHOD AND DISC DRIVE

BACKGROUND OF THE INVENTION

1. Field of the Invention

The present invention relates to a damping material excellent in damping properties which can be used as a sound insulation material or damping material for driver in data recording electronic apparatus.

The present invention also relates to a damping method which can minimize vibration developed by the rotational driving of a disc to exert a high sound-insulating or damping effect and thus is suitable for the formation of drive for data recording disc and a disc drive comprising a damping material.

The present application is based on Japanese Patent Applications No. Hei. 10-253258, 10-267466 and 10-267467 which are incorporated herein by reference.

2. Description of the Related Art

Damping materials which absorb or reflect vibration to perform sound insulation or damping have been used for various purposes such as sound insulation, sound absorption, damping, composite thereof, etc.

HDD (hard disc drive), DVDD (digital video disc drive), CDD (compact disc drive), MOD (MO drive), FDD (floppy disc drive), etc. in personal computers comprise a damping material provided in various places, e.g., between the drive main body and the substrate to prevent the generation of noise such as skirr during the rotational driving of a disc as a magnetic or optical data recording medium or the propagation of the motor vibration.

As the foregoing damping material there has heretofore been known a foamed product made of a polyurethane foam or the like. However, if this foamed product is used as a sound insulation material, it is disadvantageous in that there occurs much sound leakage, exerting a reduced sound insulating effect. Therefore, a foamed product having a specified static spring constant, a damping material obtained by forming a finely roughened polymer film on the inner wall of cells in a foamed product, a foamed product having a film applied to the external surface thereof, and a film laminated with a melt blow layer of resin have been proposed (Japanese Patent Publications Sho. 56-157347, Sho. 59-102294, Hei. 4-40381, Hei. 4-345834 and Hei. 7-261768).

However, all the conventional damping materials are disadvantageous in that they exert a poor damping effect and, if used as a sound insulation material, exert an insufficient sound insulating effect or sound deafening effect, making it impossible to prevent the generation of noise. The damping material having a finely roughened polymer film formed thereon, etc. is disadvantageous in that it requires a complicated production process and is produced at a poor production efficiency.

Further, all the conventional disc drives are disadvantageous in that the damping material incorporated therein exerts a poor damping effect and thus exerts a poor effect of deafening sound by sound insulation, sound absorption or damping or a poor effect of inhibiting the propagation of vibration, causing much noise leakage or read/write error.

SUMMARY OF THE INVENTION

It is an object of the present invention to develop a damping material excellent in damping properties which can exert a high effect of insulating from sound or damping, can be easily used in a narrow space, can be produced at a good efficiency and can be used for various purposes such as sound insulation and damping.

It is another object of the present invention to provide a damping method which can exert an excellent damping effect to perform high sound insulation or damping and can be easily used in a narrow space or the like and hence provide a disc drive which generates no noise leakage or read/write error.

It is still another object of the present invention to provide a damping material made of a porous member having an absolute characteristic impedance value of not less than 800 $kg/m^2 \cdot S$ in the frequency range of from 1.0 to 3.0 kHz.

The damping material according to the present invention can be produced at a high efficiency. The porous member which exhibits the above defined impedance characteristics can exert an excellent effect of minimizing vibrations such as sound incident thereupon. Accordingly, a damping material can be obtained which exerts an excellent sound deafening effect or damping effect to perform high noise prevention or damping and thus can be used for various purposes such as sound insulation, sound absorption, damping and composite thereof. A compressible porous member, if used as a damping material, can be easily loaded in a narrow space or the like, making it possible to prevent the increase of the entire size of the apparatus due to the increase of the thickness of the damping material.

In the foregoing description, if the damping material exhibits a damping factor a satisfying the relationships $\alpha \geq 0.01$ f neper/m, supposing that the frequency is f, it can exert a drastically enhanced effect of deafening sound or damping to perform further noise prevention or damping. Further, a porous member which exhibits a repulsion stress of from 10 to 200gf/cm$^2$ at 50% compression, if used as a damping material, can be more easily loaded in a narrow space or the like without deforming the adjacent members and can be easily produced.

The present invention also provides a damping method which comprises providing a damping material in the interior or on the periphery of a vibration-generating apparatus, characterized in that as said damping material there is used a compressible porous member having an air permeability of from $1 \times \frac{1}{10}^{10}$ to $2 \times \frac{1}{10}^2$ cc/cm$^2$/sec based on an atmospheric pressure difference of $2.039 \times \frac{1}{10}^4$ mmH$_2$O or a porous member having an absolute impedance value of not less than 800 kg/m$^2 \cdot$S in a frequency range of from 1 to 3 kHz.

The present invention further provides a disc drive comprising a motor for rotating a disc as a data recording medium and a damping material provided in the interior and/or on the periphery of a housing having at least a space in which said disc can be mounted, characterized in that said damping material is made of a compressible porous member having an air permeability of from $1 \times \frac{1}{10}^{10}$ to $2 \times \frac{1}{10}^2$ cc/cm$^2$/sec based on an atmospheric pressure difference of $2.039 \times \frac{1}{10}^4$ mmH$_2$O or a porous member having an absolute impedance value of not less than 800 kg/m$^2 \cdot$S in a frequency range of from 1 to 3 kHz.

In accordance with the present invention, the porous member constituting the damping material exhibits excellent damping properties based on the foregoing air permeability and impedance characteristics to exert a high sound deafening or damping effect developed by sound insulation, sound absorption and damping, making it possible to perform excellent noise prevention or damping for vibration-generating apparatus such as disc drive. Further, the damping material made of a porous member can be produced at a high efficiency and can be easily mounted in a narrow space or the like, making it possible to prevent the increase of the entire size of the apparatus due to the increase of the thickness of the damping material.

In the foregoing description, if the damping material is made of a porous member having a sound absorbing coefficient of not less than 20% at a frequency of 3.15 kHz or a damping factor of not less than 0.01 f neper/m where f is frequency at a frequency of 3.15 kHz, the resulting sound deafening effect or damping effect is drastically enhanced, making it possible to perform better noise prevention or damping. Further, the damping material, if made of a porous member having a repulsion stress of from 10 to 200 gf/cm$^2$ at 50% compression, can be more easily mounted in a narrow space without deforming the adjacent members. Such a damping material can also be easily produced.

Still further, the present invention provides a damping method which comprises providing a damping material in the interior or on the periphery of a vibration-generating apparatus, characterized in that as said damping material there is used one obtained by forming a film layer on a compressible porous member having an air permeability of from $1 \times 1/10^{10}$ to $2 \times 1/10^2$ cc/cm$^2$/sec based on an atmospheric pressure difference of $2.039 \times 1/10^4$ mmH$_2$O or one obtained by forming a film layer on a porous member having an absolute impedance value of not less than 800 kg/m$^2$·S in a frequency range of from 1 to 3 kHz.

The present invention also provides a disc drive comprising a motor for rotating a disc as a data recording medium and a damping material provided in the interior and/or on the periphery of a housing having at least a space in which said disc can be mounted, characterized in that said damping material is made of a material obtained by forming a film layer on a compressible porous member having an air permeability of from $1 \times 1/10^{10}$ to $2 \times 1/10^2$ cc/cm$^2$/sec based on an atmospheric pressure difference of $2.039 \times 1/10^4$ mmH$_2$O or a material obtained by forming a film layer on a porous member having an absolute impedance value of not less than 800 kg/m$^2$·S in a frequency range of from 1 to 3 kHz.

In accordance with the present invention, the damping material is formed by a porous member showing the foregoing air permeability and impedance characteristics to exert an excellent damping effect. Further, the damping material comprises a film layer formed thereon to exert an excellent effect of insulating from sound or preventing the propagation of vibration. Thus, a high sound deafening or damping effect developed by sound insulation, sound absorption and damping can be exerted, making it possible to perform excellent noise prevention or damping for vibration-generating apparatus such as disc drive.

Further, the damping material made of porous member and film layer can be produced at a high efficiency. The damping material reinforced by the film layer can be more fairly handled and thus can be fairly mounted in the apparatus, making it possible to inhibit the scattering of properties such as sound insulation and damping. Thus, the stability and reliability in prevention of noise, vibration, etc. can be enhanced. Further, the damping material can be easily mounted in a narrow space, making it possible to inhibit the increase of the entire size of the apparatus due to the increase of the thickness of the damping material.

In the foregoing description, if the damping material is made of a porous member having a sound absorbing coefficient of not less than 20% at a frequency of 3.15 kHz and a damping factor α satisfying the relationship: $\alpha \geq 0.01$ f neper/m, supposing that the frequency is f, it can exert a drastically enhanced effect of deafening from sound or damping to perform further noise prevention or damping. Further, a porous member which exhibits a repulsion stress of from 10 to 200 gf/cm$^2$ at 50% compression, if used as a damping material, can be more easily loaded in a narrow space or the like without deforming the adjacent members and can be easily produced.

Features and advantages of the invention will become understood from the following detailed description of the preferred embodiments described in conjunction with the attached drawings.

DETAILED DESCRIPTION OF THE PREFERRED EMBODIMENTS

Figure 1:
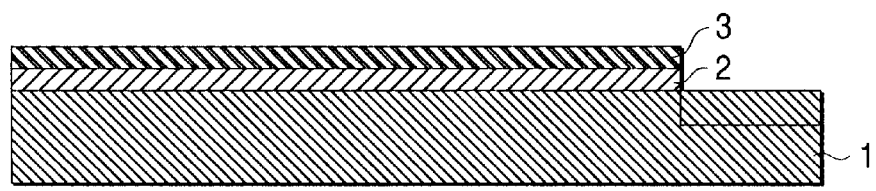
FIG. 1 is a sectional view of an applied example.

The damping material according to the present invention is made of a porous member having an absolute characteristic impedance value of not less than 800 kg/m$^2$·S in the frequency range of from 1.0 to 3.0 kHz. A porous member having an absolute characteristic impedance value of not less than 1,000 kg/M$^2$·S, particularly not less than 1,200 kg/m$^2$·S, more particularly from 2,000 to 13,000 800 kg/m$^2$·S, is preferably used from the standpoint of sound deafening effect or damping effect.

As such a porous member there may be used any material which exhibits the foregoing properties. Accordingly, as such a porous member there may be used a fiber aggregate obtained by aggregating a natural or synthetic organic or inorganic proper fiber into nonwoven fabric or a foamed product of olefin polymer, urethane polymer, acrylic polymer, vinyl chloride polymer, SBR polymer, NR polymer, NBR polymer or blend thereof. The damping material of the present invention may be formed as a laminate or mixture of two or more porous members. The foamed product preferably has an open-cell structure in which not less than 30% of cells are continuous from the standpoint of sound insulation effect, damping effect or prevention of deformation.

A porous member which can be preferably used from the standpoint of the foregoing conditions, etc. is a copolymer comprising the following three main components 1) ethylene, 2) α-olefin such as propylene or butene-1, and 3) cyclic or noncyclic polyenes having nonconjugated double bond such as dicyclopentadiene or ethylidenenorbornane, particularly one having an ethylene content of from 45 to 70 mol%, an α-olefin content of from 5 to 20 mol% and a polyene content of from 10 to 50 mol%. Preferably, the porous member comprises an EPDM foamed product having a Mooney viscosity ML$_{1+2}$ (100° C.) of from 30 to 110.

A rubber foamed product comprising the foregoing EPDM incorporated therein is preferably used. In this case, as rubber components other than EPDM there may be used proper rubber compounds such as natural rubber, butyl rubber, chloroprene rubber, acrylic rubber, styrene-butadiene rubber and nitrile-butadiene rubber. The amount of EPDM to be used is preferably not less than 20% by weight based on the total amount of rubbers from the standpoint of weathering resistance and durability.

The production of the foamed product such as EPDM satisfying the conditions of the present invention can be accomplished, e.g., by a process which comprises forming a mixture of a rubber component and a proper additive such as foaming agent and vulcanizing agent into a sheet or the like, subjecting the sheet to foaming and vulcanization, and then subjecting the sheet to adjustment of physical properties such as rupture of some or whole of cells by a proper means such as compression.

As the foregoing foaming agent there may be used a proper compound such as azo compound (e.g., azodicarbonamide, dinitrosopentamethylene tetramine, sodium hydrogencarbonate, 4,4'-oxybis (benzenesulfonylsemicarbazide)), N-nitroso compound, inorganic compound, semicarbazide compound, hydrazine compound and triazole compound. The amount of the foaming agent to be used is preferably from 5 to 50 parts by weight based on 100 parts by weight of the rubber component from the standpoint of foaming factor by which the desired physical properties are obtained.

As the vulcanizing agent there may be used a proper compound such as sulfur, p-quinonedioxim, p,p'-dibenzoylquinonedioxim, 4,4'-dithiodimorpholine, p-dinitrosobenzine, ammonium benzoate and N,N'-m-phenylenedimaleimide. The amount of the vulcanizing agent to be used is preferably from 1 to 30 parts by weight based on 100 parts by weight of the rubber component from the standpoint of desired physical properties by which malforming such as undervulcanization and gas loss can be prevented.

For the preparation of the foregoing mixture, a proper foaming aid such as urea-based foaming aid, salicylic-based foaming aid and benzoic-based foaming aid and a proper vulcanizing aid such as aldehyde ammonia-based compound, aldehydeamine-based compound, thiourea-based compound, guanidine-based compound, thiazole-based compound, sulfenamide-based compound, thiuram-based compound, dithiocarbamate-based compound and xanthogenate-based compound can be used as necessary.

Further, additives such as filler (e.g., calcium carbonate, talc, clay, mica powder, metal hydroxide such as aluminum hydroxide and magnesium hydroxide, metal oxide such as aluminum oxide and zinc oxide) and softener (e.g., paraffinic compound, naphthenic compound, aromatic compound, asphalt-based compound) may be blended during the preparation of the mixture as necessary.

In the foregoing description, the amount of the filler to be used is preferably from 30 to 300 parts by weight based on 100 parts by weight based on 100 parts by weight of the rubber component from the standpoint of control over physical properties such as strength. The amount of the softener to be used is preferably from 10 to 300 parts by weight of the rubber component from the standpoint of adjustment of viscosity of the mixture related to the foamability of the foaming material or prevention of blooming.

As the foamed product employable in the present invention such as EPDM there is preferably used one obtained by a process which comprises developing the mixture over a release liner to a thickness of from 0.5 to 50 mm, and then subjecting the sheet to heat treatment at a temperature of from 100 to 200° C. for 10 to 60 minutes so that it is foamed and vulcanized until the foaming factor reached from 3 to 30, particularly from 5 to 15, more particularly from 8 to 13. If the foaming factor falls below 3, the resulting foamed product exhibits too great a repulsion force against compression to be disposed in a narrow space or the like. On the contrary, if the foaming factor exceeds 30, the characteristic impedance of the foamed product can be hardly controlled, occasionally making it impossible to obtain satisfactory properties such as sound insulation and damping.

As the porous member which can be preferably used in the present invention there may be used one obtained by impregnating an open-cell foamed product having a specific gravity of from 0.01 to 0.9, particularly from 0.016 to 0.1, made of a proper thermoplastic resin such as polyurethane, polyethylene and polyvinyl chloride or a proper rubber polymer such as butyl rubber and isoprene rubber with a proper resin such as acrylic resin, polybutyral resin and polyester resin so that the above defined impedance characteristics can be obtained. In this case, the amount of the resin to be used can be properly determined depending on the characteristic impedance or the like but is normally from about 0.01 to 1.0 $g/cm^3$, particularly from about 0.02 to 0.1 $g/cm^3$.

The porous member which can be preferably used in the present invention from the standpoint of the effect of deafening sound or damping satisfies the relationship: $\alpha \geq 0.01$ f neper/m, particularly 0.02 f neper/m $\leq \alpha \leq 2$ f neper/m, supposing that the damping factor is $\alpha$ and the frequency is f, in a frequency range of from 1.0 to 3.0 kHz.

The porous member which can be preferably used in the present invention from the standpoint of loadability in a narrow space or the like exhibits compressibility as exemplified above. Referring to the compressibility, the porous member of the present invention preferably exhibits a repulsion stress of from 10 to 200 $gf/cm^2$, particularly from 20 to 150 $gf/cm^2$, more particularly from 30 to 120 $gf/cm^2$ at 50% compression.

The form of the damping material can be properly determined depending on the purpose such as where to apply. The thickness of the damping material is arbitrary. In general, it is not more than 100 mm, particularly from 0.5 to 70 mm, more particularly from 1 to 40 mm based on the apparent thickness. The damping material of the present invention doesn't need to be uniform in thickness and may be different from one point to another in thickness.

The damping material which differs in thickness from one point to another can be efficiently produced by grinding a porous member into flakes to prepare chips, applying an adhesive to the surface of the chips, packing the chips into a predetermined mold, and then compression-molding the chips.

The damping material according to the present invention can be formed into a predetermined form, and then provided interposed between various members, e.g., HDD main body 1 and substrate 3, or packed in a gap, or wound in the form of tape or sheet, or applied to a material or otherwise mounted so that it can be used as a sound insulating material, sound absorbing material, damping material or composite thereof to perform various actions for the minimization of the propagation of vibration in accordance with the conventional method.

In particular, the damping material according to the present invention can be preferably used mounted on data recording apparatus for recording or reproducing optical or magnetic data on a data recording medium such as disc and magnetic tape via a driving mechanism, e.g., HDD, CDD, DVDD and tape recorder. In FIG. 1, the reference numeral 2 indicates a damping material.

The damping method according to the present invention comprises providing a damping material in the interior or on the periphery of a vibration-generating apparatus, characterized in that as said damping material there is used a compressible porous member having an air permeability of from $1 \times 1/10^{10}$ to $2 \times 10^2$ cc/cm$^2$/sec based on an atmospheric pressure difference of $2.039 \times 1/10^4$ mmH$_2$O or a porous member having an absolute impedance value of not less than 800 kg/m$^2$·S in a frequency range of from 1 to 3 kHz.

Figure 3:
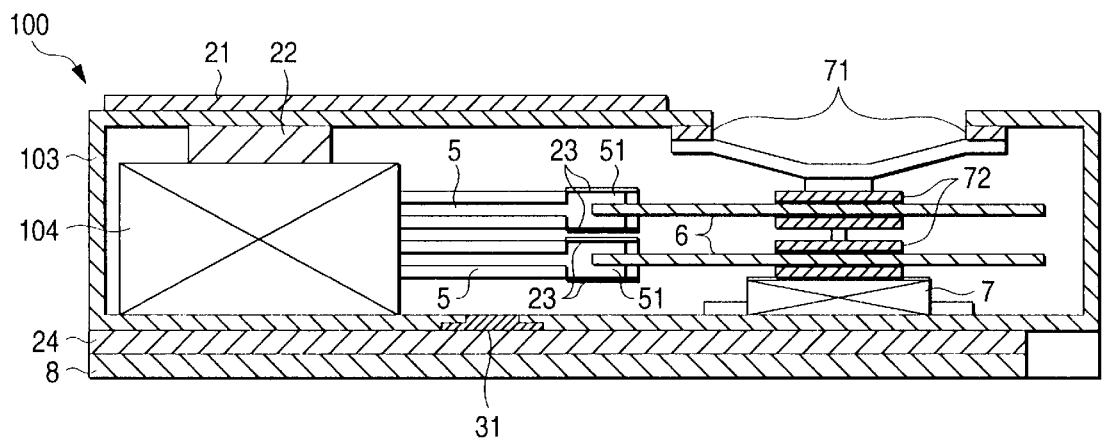
FIG. 3 is a partially sectional view illustrating an example of vibration-generating apparatus.
Figure 4A:
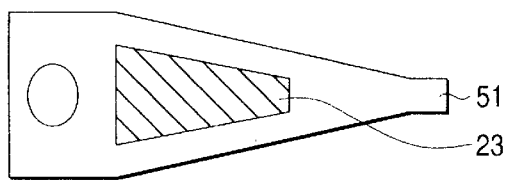
FIGS. 4A and 4B are enlarged plan view of an element constituting the vibration-generating apparatus of FIG. 3.
Figure 4B:
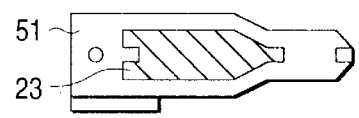

FIGS. 3, 4A and 4B each illustrate a vibration-generating apparatus 100 embodying the damping method according to the present invention. The reference numerals 21, 22, 23 and 24 each indicate a damping material. FIG. 3 illustrates HDD. FIGS. 4A and 4B are enlarged views of a suspension 51 constituting HDD.

The damping material used herein is made of a porous member showing the foregoing characteristics. In this arrangement, an excellent sound absorbing, sound deafening or damping effect can be exerted to prevent the generation of noise or the propagation of vibration more fairly. In other words, the foregoing porous member absorbs vibration energy such as sound incident thereupon and converts it to heat energy or the like to exert a sound deafening or damping effect. If this porous member exhibits the above defined air permeability and impedance characteristics, vibration such as sound which cannot be absorbed can be reflected by the interior of the porous member to drastically inhibit the leakage of vibration to the exterior. Thus, an excellent damping effect can be exerted to fairly prevent the generation of noise or the propagation of vibration.

In the foregoing description, if the air permeability of the porous member falls below $1 \times 1/10^{10}$ cc/cm$^2$/sec, the resulting sound absorption is too low to exert a sound deafening or damping effect. On the contrary, if the air permeability of the porous member exceeds $2 \times 1/10^2$ cc/cm$^2$/sec, the resulting effect of insulating from sound or preventing vibration propagation by reflection is so low that the porous member can easily transmit vibration. Thus, noise leakage or vibration propagation occurs too much to exert desired sound deafening or damping effect. This trouble occurs also when the impedance falls below 800 kg/m$^2$·S. Accordingly, when the upper limit of the air permeability and impedance characteristics corresponds to the absorption and transmission or propagation of vibration such as sound, a critical difference in effect is shown.

Therefore, as the porous member employable herein there may be used a proper material showing the foregoing characteristics such as fiber aggregate obtained by aggregating a natural or synthetic organic or inorganic proper fiber into nonwoven fabric or a foamed product of olefin polymer, urethane polymer, acrylic polymer, vinyl chloride polymer, SBR polymer, NR polymer, NBR polymer or blend thereof.

The porous member which can be preferably used from the standpoint of properties such as sound deafening and damping properties is one having an air permeability of from $1 \times 1/10^8$ to $1.5 \times 1/10^2$ cc/cm$^2$/sec, particularly from $1 \times 1/10^6$ to $1 \times 1/10^2$ cc/cm$^2$/sec and/or an absolute characteristic impedance value of not less than 1,000 kg/m$^2$·S, particularly not less than 1,200 kg/m$^2$·S, more particularly from 2,000 to 13,000 kg/m$^2$·S. The damping material may be formed as a laminate or mixture of two or more porous members. The foamed product preferably has an open-cell structure in which not less than 30% of cells are continuous from the standpoint of sound insulation effect, damping effect or prevention of deformation.

A porous member which can be preferably used from the standpoint of the foregoing conditions, etc. is a copolymer comprising the following three main components 1) ethylene, 2) α-olefin such as propylene or butene-1, and 3) cyclic or noncyclic polyenes having nonconjugated double bond such as dicyclopentadiene or ethylidenenorbornane, particularly one having an ethylene content of from 45 to 70 mol%, an α-olefin content of from 5 to 20 mol% and a polyene content of from 10 to 50 mol%. Preferably, the porous member comprises an EPDM foamed product having a Mooney viscosity $ML_{1+2}$ (100° C.) of from 30 to 110.

A rubber foamed product comprising the foregoing EPDM incorporated therein is preferably used. In this case, as rubber components other than EPDM there may be used proper rubber compounds such as natural rubber, butyl rubber, chloroprene rubber, acrylic rubber, styrene-butadiene rubber and nitrile-butadiene rubber. The amount of EPDM to be used is preferably not less than 20% by weight based on the total amount of rubbers from the standpoint of weathering resistance and durability.

The production of the foamed product such as EPDM satisfying the conditions of the present invention can be accomplished, e.g., by a process which comprises forming a mixture of a rubber component and a proper additive such as foaming agent and vulcanizing agent into a sheet or the like, subjecting the sheet to foaming and vulcanization, and then subjecting the sheet to adjustment of physical properties such as rupture of some or whole of cells by a proper means such as compression.

As the foregoing foaming agent there may be used a proper compound such as azo compound (e.g., azodicarbonamide, dinitrosopentamethylene tetramine, sodium hydrogencarbonate, 4,4,'-oxybis(benzenesulfonylsemicarbazide)), N-nitroso compound, inorganic compound, semicarbazide compound, hydrazine compound and triazole compound. The amount of the foaming agent to be used is preferably from 5 to 50 parts by weight based on 100 parts by weight of the rubber component from the standpoint of foaming factor by which the desired physical properties are obtained.

As the vulcanizing agent there may be used a proper compound such as sulfur, p-quinonedioxim, p,p'-dibenzoylquinonedioxim, 4,4'-dithiodimorpholine, p-dinitrosobenzine, ammonium benzoate and N,N'-m-phenylenedimaleimide. The amount of the vulcanizing agent to be used is preferably from 1 to 30 parts by weight based on 100 parts by weight of the rubber component from the standpoint of desired physical properties by which malforming such as undervulcanization and gas loss can be prevented.

For the preparation of the foregoing mixture, a proper foaming aid such as urea-based foaming aid, salicylic foaming aid and benzoic foaming aid and a proper vulcanizing aid such as aldehyde ammonia-based compound, aldehydeamine-based compound, thiourea-based compound, guanidine-based compound, thiazole-based compound, sulfenamide-based compound, thiuram-based compound, dithiocarbamate-based compound and xanthogenate-based compound can be used as necessary.

Further, additives such as filler (e.g., calcium carbonate, talc, clay, mica powder, metal oxide such as aluminum hydroxide and magnesium hydroxide, metal oxide such as aluminum oxide and zinc oxide) and softener (e.g., paraffinic compound, naphthenic compound, aromatic compound, asphalt-based compound) may be blended during the preparation of the mixture as necessary.

In the foregoing description, the amount of the filler to be used is preferably from 30 to 300 parts by weight based on 100 parts by weight of the rubber component from the standpoint of control over physical properties such as strength. The amount of the softener to be used is preferably from 10 to 300 parts by weight of the rubber component from the standpoint of adjustment of viscosity of the mixture related to the foamability of the foaming material or prevention of blooming.

As the foamed product employable in the present invention such as EPDM there is preferably used one obtained by a process which comprises developing the mixture over a release liner to a thickness of from 0.5 to 50 mm, and then subjecting the sheet to heat treatment at a temperature of from 100 to 200° C. for 10 to 60 minutes so that it is foamed and vulcanized until the foaming factor reached from 3 to 30, particularly from 5 to 15, more particularly from 8 to 13. If the foaming factor falls below 3, the resulting foamed product exhibits too great a repulsion force against compression to be disposed in a narrow space or the like. On the contrary, if the foaming factor exceeds 30, the characteristic impedance of the foamed product can be hardly controlled, occasionally making it impossible to obtain satisfactory properties such as sound insulation and damping.

As the porous member which can be preferably used in the present invention there may be used one obtained by impregnating an open-cell foamed product having a specific gravity of from 0.01 to 0.9, particularly from 0.016 to 0.1, made of a proper thermoplastic resin such as polyurethane, polyethylene and polyvinyl chloride or a proper rubber polymer such as butyl rubber and isoprene rubber with a proper resin such as acrylic resin, polybutyral resin and polyester resin so that the above defined impedance characteristics can be obtained. In this case, the amount of the resin to be used can be properly determined depending on the characteristic impedance or the like but is normally from about 0.01 to 1.0 $g/cm^3$, particularly from about 0.02 to 0.1 $g/cm^3$.

The porous member which can be preferably used in the present invention from the standpoint of effect of sound deafening or damping is one having a sound absorbing coefficient of not less than 20%, particularly not less than 25%, more particularly not less than 30% at a frequency of 3.15 kHz and/or a damping factor a satisfying the relationship: $\alpha \geq 0.01$ f neper/m, particularly 0.02 f neper/m $\leq \alpha \leq 2$ f neper/m, supposing that the damping factor is $\alpha$ and the frequency is f, in a frequency range of from 1.0 to 3.0 kHz.

The porous member which can be preferably used in the present invention from the standpoint of loadability in a narrow space or the like exhibits compressibility as exemplified above. Referring to the compressibility, the porous member of the present invention preferably exhibits a repulsion stress of from 10 to 200 $gf/cm^2$, particularly from 20 to 150 $gf/cm^2$, more particularly from 30 to 120 $gf/cm^2$ at 50% compression.

The form of the porous member and hence the damping material can be properly determined depending on the purpose such as where to apply. The thickness of the damping material is arbitrary. In general, it is not more than 100 mm, particularly from 0.5 to 70 mm, more particularly from 1 to 40 mm based on the apparent thickness. The porous member or damping material of the present invention doesn't need to be uniform in thickness and may be different from one point to another in thickness.

The porous member and hence damping material which differ in thickness from one point to another can be efficiently produced by grinding a porous member into flakes to prepare chips, applying an adhesive to the surface of the chips, packing the chips into a predetermined mold, and then compression-molding the chips.

As a damping material to be applied to disc drive, etc. there is preferably used one which can hardly produce corrosive gas. In this respect, a siliconic polymer, etc. can produce a volatile component that is then evaporated, e.g., on a magnetic disc to cause the change in the contact resistance with the slider that destroys the disc. Accordingly, the porous member or the following film layer constituting the damping material is preferably formed by a silicone-free material which can hardly produce gas, particularly corrosive gas.

The damping method according to the present invention involves the arrangement of the foregoing damping material in the interior or on the periphery of a vibration-generating apparatus, whereby the effect of insulating from sound, deafening from sound or damping or composite thereof can be exerted to minimize the generation of vibration from the apparatus and hence perform various actions for the minimization of propagation of vibration such as sound deafening and damping.

Accordingly, the vibration-generating apparatus to which the damping method of the present invention can be applied is not specifically limited. As mentioned above, however, since the damping material to be used herein can exert an excellent damping effect even in a thin and light form and thus can be easily applied to a narrow space as well, it can be preferably applied particularly to disc drive, tape recorder using a magnetic tape, etc. by making the best use of its advantages.

The foregoing disc drive is not specifically limited and may be, for example, in a proper arrangement such that a disc is rotated by means of a proper driving mechanism, such as HDD, DVDD, CDD, MOD and FDD, which have a motor for rotating a disc provided in the interior or exterior of a housing having at least a space in which one or more required number of sheets of disc as data recording medium and record or reproduce optical or magnetic data.

In the foregoing description, the damping material according to the present invention can be formed into a predetermined form, and then provided interposed between various members, e.g., drive main body and substrate, or packed in a gap in the apparatus, or wound in the form of tape or sheet on the apparatus or its parts, or applied to the apparatus or its parts so that it can be arranged at one or more places in the interior and/or on the vibration-generating apparatus or its housing for the purpose of performing various actions for the minimization of propagation of vibration in accordance with the conventional method such as sound absorption, sound insulation and damping or composite thereof.

In this respect, in FIG. 3, which illustrates HDD, the reference numerals 21, 22, 23 and 24 each indicate a damping material. The damping material 21 disposed on the periphery of a housing 103 is intended to damp vibration propagated to the housing. The damping material 22 disposed between the housing 103 and the upper part of a voice coil motor unit 104 is mainly intended to damp vibration developed by the voice coil motor. The gap between the housing and the upper part of the foregoing unit is normally from 2 to 5 mm but is not limited thereto.

As shown in FIGS. 4A and 4B, the damping material 23 disposed on a suspension 51 mounted on the forward end of an actuator arm 5, too, is intended for damping. The suspension has a magnetic head or the like (not shown) mounted thereon and moves together with the arm 5 relative to the disc 6 by means of the voice coil motor unit 104 to change writing/reading position. Thus, damping is important to the suspension. On the other hand, the damping material 24 disposed between the housing 103 and the substrate 8 is intended to damp vibration developed by the voice coil motor or spindle motor 7 and hence prevent the generation of noise.

The present embodiment has been described with reference to the arrangement of damping material in a plurality of places for the purpose of damping or preventing the generation of noise. In the present invention, the position at which the damping material is disposed is not limited to those described above. In practice, the damping material may be disposed at any one of these places or less or more places than mentioned above.

Other examples of place at which the damping material is disposed include space between the lower part of the voice motor unit 104 and/or spindle motor 7 and the housing 103. This disposition is effective for the prevention of occurrence of read/write error due to the propagation of vibration by the motor to the disc 6, magnetic head, etc. or the prevention of generation of noise due to the resonance of the housing. For the prevention of the generation of noise due to the resonance of the housing, the disposition of the damping material 24 between the housing 103 and the substrate 8 is particularly effective.

In the embodiment shown in FIG. 3, the spindle motor 7 is mounted in the housing 103 with a damper 71 provided thereabove. However, the damping method of the present may be applied instead of using the damper or the structure shown provided between the upper part of the spindle motor and the housing. In FIG. 3, the reference numeral 31 indicates a seal tape for a hole made in the housing. The reference numeral 72 indicates a disc clamp.

The damping method according to the present invention comprises providing a damping material in the interior or on the periphery of a vibration-generating apparatus, characterized in that as said damping material there is used one obtained by forming a film layer on a compressible porous member having an air permeability of from $1 \times \frac{1}{10}^{10}$ to $2 \times \frac{1}{10}^{2}$ cc/cm$^2$/sec based on an atmospheric pressure difference of $2.039 \times \frac{1}{10}^{4}$ mmH$_2$O or one obtained by forming a film layer on a porous member having an absolute impedance value of not less than 800 kg/m$^2$·S in a frequency range of from 1 to 3 kHz.

Figure 5A:
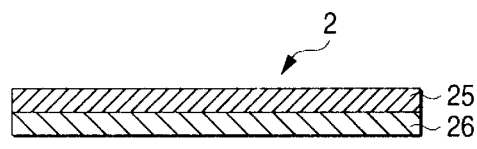
FIGS. 5A and 5B are sectional views illustrating an example of damping material.
Figure 5B:
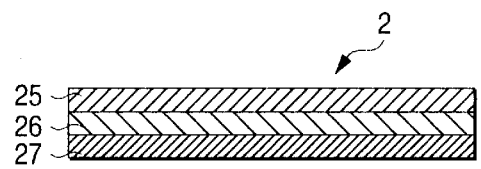

FIGS. 3, 4A and 4B each illustrate a vibration-generating apparatus 100 embodying the damping method according to the present invention. FIGS. 5A and 5B each illustrate a damping material used in the present invention. The reference numerals 2, 21, 22, 23 and 24 each indicate a damping material. The reference numerals 25 and 27 each illustrate a film layer. The reference numeral 26 indicates a porous member. FIG. 3 illustrates HDD. FIGS. 4A and 4B are enlarged views of the suspension 51 constituting HDD.

The damping material used herein comprises a porous member 26 showing the foregoing characteristics with a film layer 25, 27 provided on either or both sides thereof as shown in FIGS. 5A nd 5B. In this arrangement, an excellent effect of absorbing sound, insulating from sound or damping vibration can be exerted to perform further prevention of generation of noise or propagation of vibration. In other words, the foregoing porous member absorbs vibration energy such as sound incident thereupon and converts it to heat energy or the like to exert a sound deafening or damping effect. If this porous member exhibits the above defined air permeability and impedance characteristics, vibration such as sound which cannot be absorbed can be reflected by the interior of the porous member to drastically inhibit the leakage of vibration to the exterior. Thus, an excellent damping effect can be exerted to fairly prevent the generation of noise or the propagation of vibration.

The film layer provided on the porous member is intended to make up for the drop of self-supporting properties due to the reduction of the thickness of the porous member and hence prevent the occurrence of mounting trouble such as bending, thereby enhancing the efficiency of mounting operation. Further, the film layer is intended to inhibit the scattering of properties such as sound insulation and damping due to the drop of the working efficiency by mismounting and the scattering of the mounting state, thereby efficiently realizing high degree and homogeneous sound insulation and damping. The film layer can also be provided with an effect of insulating from vibration such as sound generated in the interior of the apparatus to prevent the leakage of vibration to the exterior of the apparatus or minimize the propagation of vibration, thereby attaining further sound insulation and damping.

The film layer can be provided partly on one or both surfaces of the porous member. The film layer can also be provided covering the whole or part of the side of the porous member. The provision of the film layer can be accomplished by an adhesion method involving the application of a film to the porous member with an adhesive, a heat fusion method, a method involving the coating of the porous member with a polymer solution that forms a film layer, etc. In this case, the film layer may be partially formed on the porous member. For example, if the porous member differs in thickness from one point to another, it is not necessary that the film layer be formed entirely on the porous member.

The film layer can be formed by a proper polymer such as those exemplified above with reference to the porous member. The kind of the polymer to be used herein is not specifically limited. In general, polyester polymers, polyolefin polymers such as polyethylene and polypropylene, polyamide polymers, polyimide polymers, polystyrene polymers, vinyl chloride polymers, fluoropolymers, etc. may be used. From the standpoint of loadability, polymers having an excellent slipperiness are desirable. From the standpoint of workability or prevention of toxic gas upon heating, polyester polymers are desirable.

From the standpoint of the capability of insulating from sound or preventing the propagation of vibration intended for the enhancement of the effect of sound insulation or damping, the film layer preferably exhibits an air permeability of not more than 0.01 cc/cm$^2$/sec based on an atmospheric pressure difference of $2.039 \times \frac{1}{10}^{4}$ mmH$_2$O. Further, the film layer may comprise additives exemplified above with reference to the porous member for a proper purpose. The increase in the weight of the film layer due to the incorporation of these additives is effective for the enhancement of the capability of preventing sound leakage or propagation of vibration by sound insulation or damping.

There is an apprehension that the damping material having a film layer provided on both surfaces of a porous member might not receive vibration such as sound due to the foregoing effect of sound insulation or damping and hence might not fully exert its desired effect of sound insulation or damping. However, since the film layer on the vibrating source side such as noise source side can be neglected from the standpoint of mass and vibrates in close contact with the vibrating source, it has practically little effect on the foregoing sound insulation or damping effect.

Accordingly, the damping material having a film layer provided on one surface of a porous member may be disposed regardless of which the film layer faces the vibrating source or the other side. In general, the damping material is disposed in such an arrangement that the porous member is exposed to the vibrating source side. The film layer, if provided on the vibrating source side, may be reduced in thickness or rendered porous by drilling so that its sound insulating or vibration propagation preventing properties can be properly lessened.

The thickness of the film layer is not specifically limited but may be properly determined. In general, it is from 5 to 200 μm, particularly from 8 to 150 μm, more particularly from 25 to 125 μm from the standpoint of reinforcing effect and reduction of thickness of the damping material. The film layer, if provided on both surfaces of the porous member, may be the same or different in material and thickness.

EXAMPLES

Example 1—1

100 parts (hereinafter by weight) of EPDM having an ethylene content of 60 mol-%, a propylene content of 10 mol-%, a polyene content of 30 mol-% and a Mooney viscosity $ML_{1+2}$ (100°C.) of 65, 200 parts of heavy calcium carbonate, 50 parts of a paraffin oil, 10 parts of an ADCA-based organic foaming agent and 2.5 parts of sulfur were kneaded by means of a kneader. The mixture thus kneaded was developed over a release liner to a thickness of 10 mm, and then heated to a temperature of 160° C. for 30 minutes so that it was foamed and vulcanized to obtain a closed-cell formed product having a foaming factor of 6. The foamed product thus obtained was passed through the nip between rolls which is one third of the thickness of the foamed product, and then sliced to a thickness of 2 mm to obtain a damping material.

The damping material thus obtained was then examined for absolute characteristic impedance value (Zc) in a frequency range of from 1.0 to 3.0 kHz by means of a two-microphone process acoustic impedance meter. The results were $3.5 \times 10^3$ kg/m² ·S.

Example 1–2

A closed-cell foamed product having a foaming factor of 20 was produced in the same manner as in Example 1—1 except that 25 parts of a DPT-based organic foaming agent were used instead of ADCA-based organic foaming agent. The foamed product thus obtained was passed through the nip between rolls which is one third of the thickness of the foamed product, and then sliced to a thickness of 2 mm to obtain a damping material having Zc of $1.7 \times 10^3$ kg/m²·S.

Example 1–3

A polyester urethane foamed product having a specific gravity of 0.055 and an average cell diameter of 0.37 mm was produced, and then sliced to a thickness of 2 mm to obtain a damping material having Zc of $1.1 \times 10^3$ kg/m²·S.

Evaluation Test 1

Damping factor α

The damping materials obtained in these examples were each examined for damping factor in a frequency range of from 1.0 to 3.0 kHz by means of a two-microphone process acoustic impedance meter.

50% compression repulsion force

The damping materials obtained in these examples were each compressed at a rate of 100 mm/min to a thickness of 50%, kept for 10 seconds, and then measured for repulsion force.

Sound reduction

Figure 2:
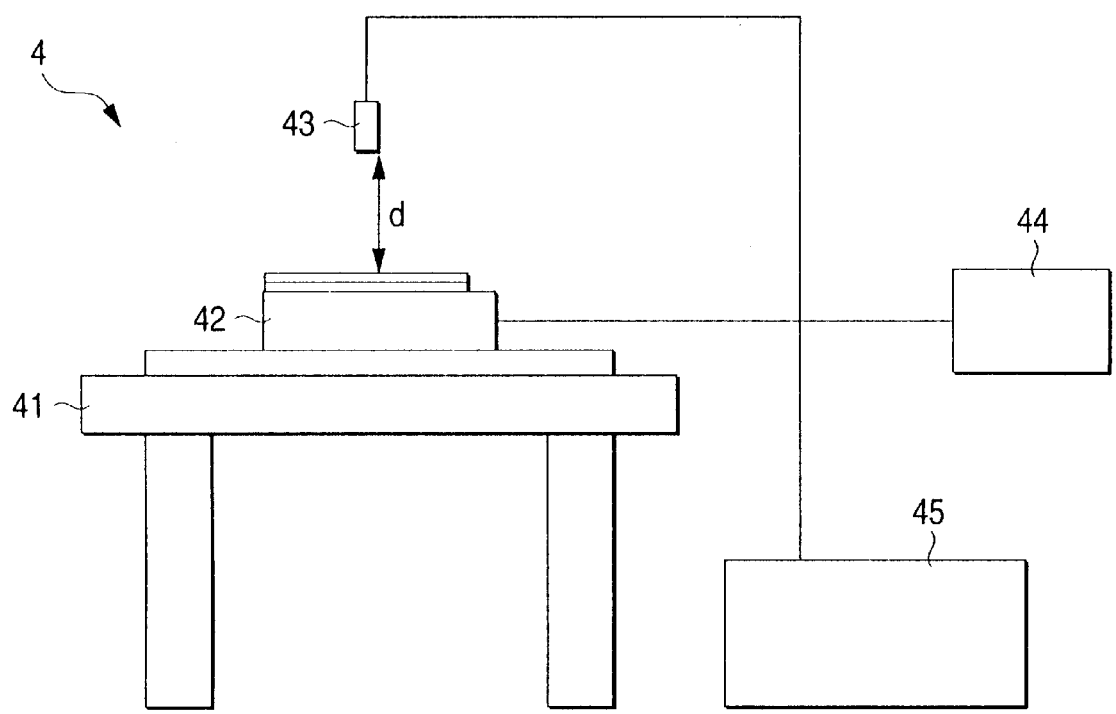
FIG. 2 is a diagrammatic view illustrating a sound measuring test.

As shown in FIG. 2, the damping material obtained in these examples were each disposed between HDD main body and substrate. The disc drive 42 thus prepared was then placed on a table 41 installed in an anechoic room. The disc drive 42 was then driven by a driving source 44. The sound thus developed was measured by a microphone 43 disposed at a distance (d) of 300 mm above the disc drive 42, and then analyzed by a analyzer 45. With the sound level developed free from damping material as a standard (44.6 dB), the reduction of noise at A characteristic overall value was then examined.

The results are set forth in Table 1 below. The damping factor set forth in the table was measured at 1.0 kHz or 3.0 kHz. The damping factor in the intermediate frequency is the intermediate between that at 1.0 kHz and that at 3.0 kHz.

TABLE 1

| Example No. | Zc (kg/m² · S) | α(neper/m) 1 kHz | α(neper/m) 3 kHz | 50% Compression repulsion force (gf/cm²) | Sound reduction (dB) |
|---|---|---|---|---|---|
| Example 1-1 | $3.5 \times 10^3$ | 35 | 84 | 46 | 5.7 |
| Example 1-2 | $1.7 \times 10^3$ | 26 | 58 | 25 | 3.0 |
| Example 1-3 | $1.1 \times 10^3$ | 23 | 37 | 60 | 2.3 |

Example 2—1

100 parts (hereinafter by weight) of EPDM having an ethylene content of 60 mol-%, a propylene content of 10 mol-%, a polyene content of 30 mol-% and a Mooney viscosity $ML_{1+2}$ (100° C.) of 65, 200 parts of heavy calcium carbonate, 50 parts of a paraffin oil, 10 parts of an ADCA-based organic foaming agent and 2.5 parts of sulfur were kneaded by means of a kneader. The mixture thus kneaded was developed over a release liner to a thickness of 10 mm, and then heated to a temperature of 160° C. for 30 minutes so that it was foamed and vulcanized to obtain a closed-cell formed product having a foaming factor of 8. The foamed product thus obtained was passed through the nip between rolls which is one third of the thickness of the foamed product, and then sliced to a thickness of 2 mm to obtain a damping material made of a porous member having an air permeability of $1 \times \frac{1}{10}^4$ cc/cm²/sec (hereinafter based on an atmospheric pressure difference of $2.039 \times \frac{1}{10}^4$ mmH₂O). The damping material thus obtained was then disposed between HDD housing 3 and substrate 8 to prepare a disc drive.

For the measurement of air permeability, a frazil (??) type tester according to JIS L 1096 was used. The air permeability was then measured at arbitrarily predetermined pressures. An approximation equation was then derived from the relationship between the predetermined pressures and the air permeability. The air permeability was then calculated by the approximation equation at an atmospheric pressure difference of $2.039 \times \frac{1}{10}^4$ mmH₂O.

Example 2—2

A disc drive was prepared in the same manner as in Example 2–1 except that as the damping material there was used one comprising a porous member having an air permeability of $1.0 \times 1/10^4$ cc/cm$^2$/sec obtained by impregnating an ether-based urethane foamed product (commercial product) having a specific gravity of 0.03 and an apparent thickness of 2 mm with an impregnating agent comprising 10 parts of an isocyanate-based crosslinking agent incorporated in 100 parts of a copolymer of 95% by weight of butyl acrylate and 5% by weight of acrylic acid in an amount of 0.05 g/cm$^3$ based on the solid content, and then heating the foamed product thus impregnated to a temperature of 150° C. for 30 minutes.

Comparative Example 2-1

A porous member having an air permeability of $5.6 \times 1/10^2$ cc/cm$^2$/sec was prepared in the same manner as in Example 2-1 except that the foamed product was passed through the nip between the rolls which had been adjusted to half the thickness of the foamed product. The porous member was then used as a damping material to prepare a disc drive.

Comparative Example 2—2

A porous member having an air permeability of $4.3 \times 1/10^{11}$ cc/cm$^2$/sec was prepared in the same manner as in Example 2-1 except that the foamed product was passed through the nip between the rolls which had been adjusted to a quarter of the thickness of the foamed product. The porous member was then used as a damping material to prepare a disc drive.

Comparative Example 2-3

A porous member having an air permeability of $8.6 \times 1/10^2$ cc/cm$^2$/sec was prepared in the same manner as in Example 2— 2 except that the amount of the impregnating agent with which the foamed product is impregnated was 0.008 g/cm$^2$. The porous member was then used as a damping material to prepare a disc drive.

Comparative Example 2-4

A porous member the air permeability of which is close to measurement limit (air impermeable) was prepared in the same manner as in Example 2—2 except that the amount of the impregnating agent with which the foamed product is impregnated was 2.0 g/cm$^2$. The porous member was then used as a damping material to prepare a disc drive.

Evaluation Test 2

Sound absorbing coefficient

The damping materials (porous members) obtained in Examples 2–1 and 2—2 and Comparative Examples 2–1 to 2–4 were each measured for sound absorbing coefficient (damping capacity) by means of a perpendicularly incident sound absorbing coefficient meter according to JIS A 1405.

Repulsion force

The damping materials obtained in Examples 2–1 and 2—2 and Comparative Examples 2–1 to 2–4 were each compressed at a rate of 100 mm/min to a thickness of 50%, kept for 10 seconds, and then measured for repulsion force.

Sound reduction

As shown in FIG. 2, the disc drives 42 obtained in these examples and comparative examples were each placed on a table 41 installed in an anechoic room. The disc drive 42 was then driven by a driving source 44. The sound thus developed was measured by a microphone 43 disposed at a distance (d) of 300 mm above the disc drive 42, and then analyzed by a analyzer 45. With the sound level developed free from damping material as a standard (44.6 dB), the reduction of noise at A characteristic overall value was then examined.

The results are set forth in Table 2–1.

TABLE 2-1

| Example No. | Air permeability of porous Member (cc/cm$^2$/sec) | % Sound absorbing coefficient | Repulsion force (gf/cm$^2$) | Sound reduction (dB) |
|---|---|---|---|---|
| Example 2-1 | $1.0 \times 1/10^4$ | 35 | 44 | 8.1 |
| Example 2-2 | $1.0 \times 1/10^4$ | 32 | 44 | 7.6 |
| Comparative Example 2-1 | $5.6 \times 1/10^2$ | 35 | 38 | 6.4 |
| Comparative Example 2-2 | $4.3 \times 1/10^{11}$ | 35 | 250 | 8.2*1 |
| Comparative Example 2-3 | $8.6 \times 1/10^2$ | 35 | 52 | 5.0 |
| Comparative Example 2-4 | Close to measurement Limit | 28 | 280 | Unable to mount*2 |

*1: The substrate was deformed due to great compressive repulsion force.
*2: Unable to mount due to great compressive repulsion force Example 2-3

A closed-cell foamed product with a foaming factor of 6 having an ADCA-based organic foaming agent content of 10 parts was prepared in the same manner as in Example 2-1. The foamed product thus prepared was passed through the nip between rolls which is one third of the thickness of the foamed product, and then sliced to a thickness of 2 mm to obtain a porous member from which a damping material was then obtained. The damping material was then used to prepare a disc drive.

The damping material thus obtained was then examined for absolute characteristic impedance value (Zc) in a frequency range of from 1.0 to 3.0 kHz by means of a two-microphone process acoustic impedance meter. The results were $3.5 \times 10^3$ kg/m$^2$ •S.

Example 2-4

A disc drive was prepared in the same manner as in Example 2–3 except that a closed-cell foamed product having a foaming factor of 20 was obtained using 25 parts of a DPT-based organic foaming agent instead of the ADCA-based organic foaming agent and the foamed product thus obtained was passed through the nip between rolls which is one third of the thickness of the foamed product, and then sliced to a thickness of 2 mm to obtain a damping material comprising a porous member having Zc of 1, 700.

Example 2-5

A disc drive was prepared in the same manner as in Example 2–3 except that a polyester-based urethane foamed product having a specific gravity of 0.055 and an average cell diameter of 0.37 mm was prepared and the foamed product thus prepared was sliced to a thickness of 2 mm to obtain a damping material comprising a porous member having Zc of 1,100.

Evaluation Test 3

Damping factor α

The porous members (damping materials) obtained in Examples 2–3 to 2–5 were each examined for damping factor in a frequency range of from 1.0 to 3.0 kHz by means of a two-microphone process acoustic impedance meter.

Repulsion force

The damping materials obtained in Examples 2–3 to 2–5 were each examined for repulsion force in the same manner as mentioned above.

Sound reduction

The disc drives obtained in Examples 2–3 to 2–5 were each examined for noise reduction in the same manner as mentioned above.

The results are set forth in Table 2—2. The damping factor set forth in the table was measured at 1.0 kHz or 3.0 kHz. The damping factor in the intermediate frequency is the intermediate between that at 1.0 kHz and that at 3.0 kHz.

TABLE 2-2

| Example No. | Zc (kg/ $m^2 \cdot S$) | α(neper/m) 1 kHz | α(neper/m) 3 kHz | Repulsion force (gf/cm$^2$) | Sound reduction (dB) |
|---|---|---|---|---|---|
| Example 2-3 | 3,500 | 35 | 84 | 46 | 5.7 |
| Example 2-4 | 1,700 | 26 | 58 | 25 | 3.0 |
| Example 2-5 | 1,100 | 23 | 37 | 60 | 2.3 |

Examples 3–1, 3–2

100 parts (hereinafter by weight) of EPDM having an ethylene content of 60 mol-%, a propylene content of 10 mol-%, a polyene content of 30 mol-% and a Mooney viscosity $ML_{1+2}$ (100° C.) of 65, 200 parts of heavy calcium carbonate, 50 parts of a paraffin oil, 15 parts of an ADCA-based organic foaming agent and 2.5 parts of sulfur were kneaded by means of a kneader. The mixture thus kneaded was developed over a release liner to a thickness of 10 mm, and then heated to a temperature of 160° C. for 30 minutes so that it was foamed and vulcanized to obtain a closed-cell formed product having a foaming factor of 8. The foamed product thus obtained was passed through the nip between rolls which is one third of the thickness of the foamed product, and then sliced to a thickness of 2 mm to obtain a porous member having an air permeability of $1.0 \times 1/10^4$ cc/cm$^2$/sec (hereinafter based on an atmospheric pressure difference of $2.039 \times 1/10^4$ mmH$_2$O). A PET film having a thickness of 38 μm was then bonded to one surface of the porous member with an adhesive layer provided interposed therebetween to obtain a damping material.

Subsequently, the damping material 24 thus obtained was disposed between HDD housing 3 and substrate 8 to prepare a disc drive. The damping material 24 was disposed in such an arrangement that the film layer is on the substrate side in Example 3–1 and on the housing side in Example 3–2. For the measurement of air permeability, a frazil type tester according to JIS L 1096 was used. The air permeability was then measured at arbitrarily predetermined pressures. An approximation equation was then derived from the relationship between the predetermined pressures and the air permeability. The air permeability was then calculated by the approximation equation at an atmospheric pressure difference of $2.039 \times 1/10^4$ mmH$_2$O.

Example 3—3

A damping material was obtained in the same manner as in Example 3–1 except that the PET film was provided on both surfaces of the porous member. The damping material thus obtained was then used to prepare a disc drive.

Example 3–4

A disc drive was prepared in the same manner as in Example 3–1 except that as the damping material there was used one comprising a porous member having an air permeability of $1.0 \times 1/10^4$ cc/cm$^2$/sec obtained by impregnating an ether-based urethane foamed product (commercial product) having a specific gravity of 0.03 and an apparent thickness of 2 mm with an impregnating agent comprising 10 parts of an isocyanate-based crosslinking agent incorporated in 100 parts of a copolymer of 95% by weight of butyl acrylate and 5% by weight of acrylic acid in an amount of 0.05 g/cm$^3$ based on the solid content, and then heating the foamed product thus impregnated to a temperature of 150° C. for 30 minutes.

Comparative Example 3–1

The porous member obtained in Example 3–1 was then used as a damping material to prepare a disc drive.

Comparative Example 3–2

The porous member obtained in Example 3–4 was then used as a damping material to prepare a disc drive.

Comparative Example 3—3

A porous member having an air permeability of $5.6 \times 1/10^2$ cc/cm$^2$/sec was prepared in the same manner as in Example 3–1 except that the foamed product was passed through the nip between the rolls which had been adjusted to half the thickness of the foamed product. The porous member was then used as a damping material to prepare a disc drive.

Comparative Example 3–4

A porous member having an air permeability of $4.3 \times 1/10^{11}$ cc/cm$^2$/sec was prepared in the same manner as in Example 3–1 except that the foamed product was passed through the nip between the rolls which had been adjusted to a quarter of the thickness of the foamed product. The porous member was then used as a damping material to prepare a disc drive.

Comparative Example 3–5

A porous member having an air permeability of $8.6 \times 1/10^2$ cc/cm$^2$/sec was prepared in the same manner as in Example 3–4 except that the amount of the impregnating agent with which the foamed product is impregnated was 0.008 g/cm$^2$. The porous member was then used as a damping material to prepare a disc drive.

Comparative Example 3–6

A porous member the air permeability of which is close to measurement limit (air impermeable) was prepared in the same manner as in Example 3–4 except that the amount of the impregnating agent with which the foamed product is impregnated was 2.0 g/cm$^2$. The porous member was then used as a damping material to prepare a disc drive.

Evaluation Test 4

Sound absorbing coefficient

The damping materials (porous members) obtained in Examples 3–1 to 3–4 and Comparative Examples 3–1 to 3–6 were each measured for sound absorbing coefficient (damping capacity) by means of a perpendicularly incident sound absorbing coefficient meter according to JIS A 1405.

Repulsion force

The damping materials obtained in Examples 3–1 to 3–4 and Comparative Examples 3–1 to 3–6 were each compressed at a rate of 100 mm/min to a thickness of 50%, kept for 10 seconds, and then measured for repulsion force.

Sound reduction

As shown in FIG. 2, the disc drives 42 obtained in these examples and comparative examples were each placed on a table 41 installed in an anechoic room. The disc drive 42 was then driven by a driving source 44. The sound thus developed was measured by a microphone 43 disposed at a distance (d) of 300 mm above the disc drive 42, and then analyzed by a analyzer 45. With the sound level developed free from damping material as a standard (44.6dB), the reduction of noise at A characteristic overall value was then examined.

Handleability

During the foregoing installing operation, the damping material was examined for handleability.

The results are set forth in Table 3–1 below.

Example 3–7

A damping material was obtained in the same manner as in Example 3–5 except that the PET film was provided on both surfaces of the porous member. The damping material thus obtained was then used to prepare a disc drive.

Example 3–8

A damping material was obtained in the same manner as in Example 3–5 except that as the porous member there was used one having Zc of $1.7 \times 10^3$ kg/m$^2$·S obtained by preparing a closed-cell foamed product having a foaming factor of 20 comprising 25 parts of a DPT-based organic foaming agent instead of ADCA-based organic foaming agent, passing the foamed product thus obtained through the nip between rolls which is one third of the thickness of the foamed product, and then slicing the material to a thickness of 2 mm. A disc drive was then prepared from the damping material.

Example 3–9

A damping material was obtained in the same manner as in Example 3–5 except that as the porous member there was

TABLE 3-1

| Example No. | Air permeability of porous member (cc/cm$^2$/sec) | % Sound absorbing coefficient | Repulsion force (gf/cm$^2$) | Sound reduction (dB) | Handleability |
|---|---|---|---|---|---|
| Example 3-1 | $1.0 \times 1/10^4$ | 35 | 44 | 8.8 | Good |
| Example 3-2 | $1.0 \times 1/10^4$ | 35 | 44 | 8.6 | Good |
| Example 3-3 | $1.0 \times 1/10^4$ | 35 | 45 | 9.1 | Good |
| Example 3-4 | $1.0 \times 1/10^4$ | 32 | 44 | 8.3 | Good |
| Comparative Example 3-1 | $1.0 \times 1/10^4$ | 35 | 44 | 8.1 | Fair |
| Comparative Example 3-2 | $1.0 \times 1/10^4$ | 32 | 44 | 7.6 | Fair |
| Comparative Example 3-3 | $5.6 \times 1/10^2$ | 35 | 38 | 6.4 | Fair |
| Comparative Example 3-4 | $4.3 \times 1/10^{11}$ | 35 | 250 | 8.2 | Poor*1 |
| Comparative Example 3-5 | $8.6 \times 1/10^2$ | 35 | 52 | 5.0 | Fair |
| Comparative Example 3-6 | Close to measurement limit | 28 | 280 | Unable to mount | —*2 |

*1: The substrate was deformed due to great compressive repulsion force.
*2: Unable to mount due to great compressive repulsion force

Examples 3–5, 3–6

A closed-cell foamed product having an ADCA-based organic foaming agent content of 10 parts and a foaming factor of 6 was obtained in the same manner as in Example 3–1. The foamed product thus obtained was passed through the nip between rolls which is one third of the thickness of the foamed product, and then sliced to a thickness of 2 mm to obtain a porous member. A PET film having a thickness of 38 μm was then bonded to one surface of the porous member with an adhesive layer provided interposed therebetween to obtain a damping material from which a disc drive was then prepared. The damping material was disposed in such an arrangement that the film layer is at the substrate side in Example 3–5 and at the housing side in Example 3–6.

The porous member thus obtained was then examined for absolute characteristic impedance value (Zc) in a frequency range of from 1.0 to 3.0 kHz by means of a two-microphone process acoustic impedance meter. The results were $3.5 \times 10^3$ kg/m$^2$ ·S.

used one having Zc of 1,100 kg/m$^2$·S obtained by preparing a polyester-based urethane foamed product having a specific gravity of 0.055 and an average cell diameter of 0.37 mm, and then slicing the foamed product to a thickness of 2 mm. A disc drive was then prepared from the damping material.

Comparative Example 3–7

The porous member obtained in Example 3–5 was then used as a damping material to prepare a disc drive.

Comparative Example 3–8

The porous member obtained in Example 3–8 was then used as a damping material to prepare a disc drive.

Comparative Example 3–9

The porous member obtained in Example 3–9 was then used as a damping material to prepare a disc drive.

Evaluation Test 5

Damping factor α

The porous members (damping materials) obtained in Examples 3–5 to 3–9 (Comparative Examples 3–7 to 3–9) were each examined for damping factor in a frequency range of from 1.0 to 3.0 kHz by means of a two-microphone process acoustic impedance meter.

Repulsion force

The damping materials obtained in Examples 3–5 to 3–9 and Comparative Examples 3–7 to 3–9 were each examined for repulsion force in the same manner as mentioned above.

Sound reduction

The disc drives obtained in Examples 3–5 to 3–9 and Comparative Examples 3–7 to 3–9 were each examined for noise reduction in the same manner as mentioned above.

Handleability

During the foregoing installing operation, the damping material was examined for handleability.

The results are set forth in Table3-2 below. The damping factor set forth in the table was measured at 1.0 kHz or 3.0 kHz. The damping factor in the intermediate frequency is the intermediate between that at 1.0 kHz and that at 3.0 kHz.

TABLE 3-2

| Example No. | Zc (kg/m² · S) | α(neper/m) 1 kHz | α(neper/m) 3 kHz | Repulsion force (gf/cm²) | Sound reduction (dB) | Handleability |
|---|---|---|---|---|---|---|
| Example 3-5 | 3,500 | 35 | 84 | 46 | 6.5 | Good |
| Example 3-6 | 3,500 | 35 | 84 | 46 | 6.3 | Good |
| Example 3-7 | 3,500 | 35 | 84 | 47 | 6.8 | Good |
| Example 3-8 | 1,700 | 26 | 58 | 25 | 3.8 | Good |
| Example 3-9 | 1,100 | 23 | 37 | 60 | 3.1 | Good |
| Comparative Example 3-7 | 3,500 | 35 | 84 | 46 | 5.7 | Fair |
| Comparative Example 3-8 | 1,700 | 26 | 58 | 25 | 3.0 | Fair |
| Comparative Example 3-9 | 1,100 | 23 | 37 | 60 | 2.3 | Fair |

While the presently preferred embodiment of the present invention has been shown and described, it is to be understood that the disclosure is for the purpose of illustration and that various changes and modification may be made without departing from the scope of the invention as set forth in the appended claims.

What is claimed is:

1. A damping material made of one of fibers aggregated into fabric and a foamed product having an absolute characteristic impedance value of not less than 800 kg/m²•S in a frequency range of from 1.0 to 3.0 kHz.

2. A damping material according to claim 1, wherein said damping material satisfies a relationship: $\alpha \geq 0.01$ f neper/m, supposing that a damping factor is α and a frequency is f in the frequency range of from 1.0 to 3.0 kHz.

3. A damping material according to claim 2, wherein said damping material exhibits a repulsion stress of from 10 to 200 gf/cm² at 50% compression.

4. A damping material according to claim 1, wherein said damping material exhibits a repulsion stress of from 10 to 200 gf/cm² at 50% compression.

5. A damping material according to claim 1, wherein said fibers are one of natural fibers, synthetic organic fibers, and synthetic inorganic fibers, and
wherein said foamed product is one of olefin polymer, urethane polymer, acrylic polymer, vinyl chloride polymer, SBR polymer, NR polymer, NBR polymer, and a blend thereof.

6. A damping material according to claim 1, wherein said foamed product includes (a) ethylene, (b) α-olefin, and (c) one of cyclic polyenes and noncyclic polyenes.

7. A damping material according to claim 1, wherein said foamed product is one of natural rubber, butyl rubber, chloroprene rubber, acrylic rubber, styrene-butadiene rubber, and nitrile-butadiene rubber.

8. A damping method comprising a step of:
providing a damping material one of in an interior and on a periphery of a vibration-generating apparatus, wherein said damping material comprises one of fibers aggregated into fabric and a foamed product having an absolute impedance value of not less than 800 kg/m²•S in a frequency range of from 1 to 3 kHz.

9. A damping method according to claim 8 wherein said one of fibers aggregated into fabric and a foamed product constituting the damping material exhibits one of the following condition (1) a sound absorbing coefficient of not less than 20% at a frequency of 3.15 kHz and (2) a damping factor α satisfying in a frequency range of from 1 to 3 kHz the relationship $\alpha \geq 0.01$ f neper/m wherein f is frequency.

10. A damping method according to claim 9, wherein said vibration-generating apparatus is a disc drive for rotating disc and said one of fibers aggregated into fabric and a foamed product constituting the damping material exhibits a repulsion stress of from 10 to 200 gf/cm² at 50% compression.

11. A damping method according to claim 8 wherein said vibration-generating apparatus is a disc drive for rotating a disc and said one of fibers aggregated into fabric and a foamed product constituting the damping material exhibits a repulsion stress of from 10 to 200 gf/cm² at 50% compression.

12. A disc drive comprising:
a motor for rotating a disc as a data recording medium; and
a damping material provided in an interior and/or on a periphery of a housing having at least a space in which said disc can be mounted,
wherein said damping material comprising one of fibers aggregated into fabric and a foamed product having an absolute impedance value of not less than 800 mkg/m²•S in a frequency range of from 1 to 3 kHz.

13. A damping method comprising a step of:
providing a damping material one of in an interior and on a periphery of a vibration-generating apparatus,
wherein said damping material comprises one of a compressible fiber aggregate and a compressible foamed product having an air permeability of from $1 \times 1/10^{10}$ to $2 \times 1/10^2$ cc/cm²/sec based on an atmospheric pressure difference of $2.039 \times 1/10^4$ mmH₂O, and a film layer formed on said one of a compressible fiber aggregate and a compressible foamed product, wherein said one of a compressible fiber aggregate and a compressible foamed product has one of the following condition (1) a sound absorbing coefficient of not less than 20% at a frequency of 3.15 kHz and (2) a damping factor α satisfying in a frequency range of from 1 to 3 kHz the relationship $\alpha \geq 0.01$ f neper/m where f is frequency, and said film layer has a thickness of from 5 to 200 μm and is made of one of a polyester, polyethylene, polyamide, polyimide, polystyrene and vinyl chloride polymer.

14. A damping method according to claim 13, wherein said vibration-generating apparatus is a disc drive for rotating a disc and said damping material is made of a porous member having a repulsion stress of from 10 to 200 gf/cm² at 50% compression.

15. A damping method comprising a step of:

providing a damping material one of in an interior and on a periphery of a vibration-generating apparatus, wherein said damping material comprises one of fibers aggregated into fabric and a foamed product having an absolute impedance value of not less than 800 kg/m²·S in a frequency range of from 1 to 3 kHz, and a film layer on said one of fibers aggregated into fabric and a foamed product.

16. A damping method according to claim 15, wherein said one of fibers aggregated into fabric and a foamed product has one of the following conditions (1) a sound absorbing coefficient of not less than 20% at a frequency of 3.15 kHz and (2) a damping factor α satisfying in a frequency range of from 1 to 3 kHz the relationship $\alpha \geq 0.01$ f neper/m where f is frequency, and said film layer has a thickness of from 5 to 200 μm and is made of one of a polyester, polyethylene, polyamide, polyimide, polystyrene and vinyl chloride polymer.

17. A damping method according to claim 16 wherein said vibration-generating apparatus is a disc drive for rotating a disc and said one of fibers aggregated into fabric and a foamed product has a repulsion stress of from 10 to 200 gf/cm² at 50% compression.

18. A damping method according to claim 15 wherein said vibration-generating apparatus is a disc drive for rotating a disc and said one of fibers aggregated into fabric and a foamed product has a repulsion stress of from 10 to 200 gf/cm² to 50% compression.

19. A disc drive comprising:

motor for rotating a disc as a data recording medium; and a damping material provided in an interior and/or on a periphery of a housing having at least a space in which said disc can be mounted, wherein said damping material comprises on of a compressible fiber aggregate and a compressible foamed product having an air permeability of from $1 \times 1/10^{10}$ to $2 \times 1/10^2$ cc/cm²/sec based on an atmospheric pressure difference of $2.039 \times 1/10^4$ mmH2O and a film layer formed on said one of a compressible fiber aggreagate and a compressible foamed product.

20. A disc drive comprising:

a motor for rotating a disc as a data recording medium; and a damping material provided in an interior and/or on a periphery of a housing having at least a space in which said disc can be mounted, wherein said damping material comprises one of fibers aggregated into fabric and a foamed product having an absolute impedance value of not less than 800 kg/m²·S in a frequency range of from 1 to 3 kHz, and a film layer formed on said one of fibers aggregated into fabric and a foamed product.

\* \* \* \* \*